United States Patent
Lan et al.

(10) Patent No.: US 9,876,655 B2
(45) Date of Patent: Jan. 23, 2018

(54) PRECODING-CODEBOOK-BASED SECURE UPLINK IN LTE

(71) Applicant: MEDIATEK Singapore Pte. Ltd., Singapore (SG)

(72) Inventors: Pang-Chang Lan, Monterey Park, CA (US); Tze-Ping Low, Lexington, MA (US); Jangwook Moon, Westford, MA (US)

(73) Assignee: MEDIATEK Singapore Pte. Ltd., Singapore (SG)

( * ) Notice: Subject to any disclaimer, the term of this patent is extended or adjusted under 35 U.S.C. 154(b) by 171 days.

(21) Appl. No.: 14/460,599

(22) Filed: Aug. 15, 2014

(65) Prior Publication Data
US 2015/0049713 A1    Feb. 19, 2015

Related U.S. Application Data

(60) Provisional application No. 61/866,597, filed on Aug. 16, 2013.

(51) Int. Cl.
*H04L 25/02* (2006.01)
*H04W 12/02* (2009.01)
*H04L 9/08* (2006.01)

(52) U.S. Cl.
CPC ........ *H04L 25/0224* (2013.01); *H04L 9/0844* (2013.01); *H04L 9/0875* (2013.01); *H04W 12/02* (2013.01); *H04L 2209/34* (2013.01); *H04L 2209/80* (2013.01)

(58) Field of Classification Search
CPC .. H04L 25/0224; H04L 9/3215; H04W 12/02; H04W 72/04
USPC ....................................................... 370/272
See application file for complete search history.

(56) References Cited

U.S. PATENT DOCUMENTS

| | | | | |
|---|---|---|---|---|
| 8,989,299 | B2* | 3/2015 | Zhou | H04B 7/0639 375/285 |
| 2009/0262695 | A1* | 10/2009 | Chen | H04L 5/0053 370/329 |
| 2011/0261894 | A1* | 10/2011 | Yu | H04B 7/0413 375/267 |

(Continued)

OTHER PUBLICATIONS

Lan, Pang-Chang, Wu, Chih-Yao, Lee, Chia-Han, Yeh, Ping-Cheng, and Cheng, Chen-Mou (PMI-based MIMO OFDM PHY Integrated Key Exchange (P-MOPI) Scheme, published Jan. 21, 2011).*

*Primary Examiner* — Noel Beharry
*Assistant Examiner* — Rodrick Mak
(74) *Attorney, Agent, or Firm* — Imperium Patent Works; Zheng Jin

(57) ABSTRACT

A Precoding-codebook-base Secure Uplink (PSU) scheme is proposed to utilize the channel reciprocity, uniqueness, and randomness in solving the secure initiation problem. A UE receives a first reference signal via first downlink channel in a mobile communication network. The UE performs channel estimation based on the first reference signal and thereby obtaining a first channel response matrix of the first downlink channel. The UE then encodes secrecy information onto a second reference signal. The UE transmits the second reference signal via a second uplink channel. The secrecy information is hidden in the uplink channel through a precoding operation such that the secrecy information can be extracted when the second uplink channel is reciprocal to the first downlink channel.

14 Claims, 11 Drawing Sheets

(56) References Cited

U.S. PATENT DOCUMENTS

| | | | | |
|---|---|---|---|---|
| 2012/0113830 A1* | 5/2012 | Zhu | ................ | H04B 7/024 370/252 |
| 2012/0157140 A1* | 6/2012 | Kim | ................ | H04B 7/0634 455/501 |
| 2012/0201191 A1* | 8/2012 | Seo | ................ | H04L 5/001 370/315 |
| 2012/0320832 A1* | 12/2012 | Kim | ................ | H04L 1/0029 370/328 |
| 2013/0294279 A1* | 11/2013 | Nagata | ................ | H04B 7/024 370/252 |
| 2013/0301746 A1* | 11/2013 | Mobasher | ................ | H04B 7/0456 375/267 |
| 2015/0110025 A1* | 4/2015 | Chae | ................ | H04B 7/024 370/329 |

\* cited by examiner

PRECODING-CODEBOOK-BASED SECURE UPLINK IN LTE

CROSS REFERENCE TO RELATED APPLICATIONS

This application claims priority under 35 U.S.C. §119 from U.S. Provisional Application No. 61/866,597, entitled "Precoding-codebook-based Secure Uplink in LTE," filed on Aug. 16, 2013, the subject matter of which is incorporated herein by reference.

TECHNICAL FIELD

The disclosed embodiments relate generally to wireless network communications, and, more particularly, to precoding-codebook-based secure uplink transmission in LTE networks.

BACKGROUND

In advanced 3.5G to 4 G communication standards (e.g., Long Term Evolution (LTE) and LTE-advanced), security has been an important issue due to the increasing attention on user privacy. Compared to 2G Global System for Mobile Communications (GSM), the Evolved Packet System (EPS) that comprises LTE and System Architecture Evolution (SAE) has stronger protection on information security. For example, the authentication process in GSM only allows the serving network (SN) to authenticate the mobile stations, and the mobile station cannot authenticate the SN. Fake base stations thus can be transparent by imitating the mobile stations and forwarding their messages to the genuine base stations. This is the famous man-in-the-middle attack. The EPS, on the other hand, introduces mutual authentication between the SN and UEs. Therefore, EPS has resistance to man-in-the-middle attacks. Nevertheless, backward compatibility with GSM or General Packet Radio Service (GPRS) can still result in the risks of being attacked.

Despite the security improvement in the EPS, there are still some security issues remaining unsolved. For instance, the International Mobile Subscriber Identity (IMSI) is a special sequence of numbers unique for each mobile user in the cellular network. It serves as an identification that allows the Mobility Management Entity (MME) in the SN to authenticate the UE. To prevent eavesdroppers from obtaining the IMSI and accordingly having the ability to track the UE, the IMSI should be sent as infrequently as possible. For not revealing IMSI often, the MME will allocate Global Unique Temporary UE Identity (GUTI) after the UE establishes connection with the SN. Hence, the UE can mask its IMSI by transmitting the GUTI for the authentication process afterwards. However, the association between IMSI and GUTI is stored in the local MME and Home Subscriber Server (HSS). If the UE goes to a new area with new operators, the new networks can only fetch the association between the IMSI and GUTI from the old network. If the address of the home SN is not known or the connection between the local SN and the home SN fails, the local SN cannot retrieve the association anymore. As a result, the IMSI must be sent first to get initial authentication. Therefore, in places such as airports, the transmission of IMSI is not preventable, which makes eavesdropping and tracking possible.

The above problem is referred to as a secure initiation problem where passive eavesdroppers present as security threats. The secure initiation problem is not restricted to the security of the IMSI. It concerns the security of any confidential information sent before a secure transmission link is established. For example, the SN and the UE need to have an agreement on secret keys to allow cryptography schemes to work. The security transmission link is referred to as the establishment of symmetric cryptosystems such as Data Encryption Standard (DES) and Advanced Encryption Standard (AES) that use the same secret key for encryption and decryption. The symmetric cryptosystems are secure if the symmetric key is only known to the eNodeB and the legitimate UEs. Nevertheless, once the secrecy assumption of the key does not hold (i.e., the eavesdropper has the secret key), then the symmetric cryptosystems are not safe anymore. Therefore, protecting the confidential messages such as the secret key before the establishment of the symmetric cryptosystems is extremely important.

Applying asymmetric cryptography (e.g., RSA and Diffie-Hellman key exchange) to protect the symmetric secret key or IMSI is a possible solution to the secure initiation problem. The basic idea of asymmetric cryptography is to use different keys for encryption and decryption. By concealing the decryption key, the computation complexity of decrypting the confidential messages with the knowledge of only the encryption key is so high that eavesdroppers cannot finish the decryption in time. A successful decryption by a super computer usually takes over ten years. However, asymmetric cryptography has much more computation complexity in key generation, encryption, and decryption than the symmetric cryptography even though both keys are known. In addition, the asymmetric cryptography generally needs much larger secret keys than the symmetric cryptography (over ten time usually) to achieve the same level of security. Hence, due to the hardware cost, time efficiency, and power saving concerns, the asymmetric cryptography is not suitable for user devices.

To solve the secure initiation problem and to overcome the disadvantage of the asymmetric cryptography, security mechanisms can be built on the physical layer. Specifically, in wireless environments with Time-Division Duplex (TDD) schemes, the MIMO channel from the eNodeB to the UE and that from the UE to the eNodeB are identical by the operation of conjugate transpose (i.e., adjoint). On the other hand, the channels seen by eavesdroppers would be very different from the eNodeB-to-UE channel. In addition, channel realization would vary significantly through coherence time, which imposes a great difficulty for the eavesdroppers to predict. Hence, due to the reciprocity, uniqueness, and randomness of the channel, the eNodeB and the UE can quantize their observations on the channel to generate identical secret keys without explicitly transmitting the secret keys.

However, there are three major challenges ahead. First, because of channel estimation errors, the secret keys generated by the eNodeB and the UE might not match each other. How to quantize the channel so that the key error rate (KER) or the probability of key mismatch between the eNodeB and the UE is acceptably low is an issue. Second, although eavesdroppers cannot see the channel experienced by the eNodeB and the UE, they may still try to predict the channel by reconstructing the physical environment. For simple environments such as an empty room, it is possible to simulate the surroundings and rebuild the channels by, for example, ray tracing. Third, although channel will vary from time to time, the variation depends on the speed of the eNodeB and the UE. If the channel experiences slow fading, the secret keys that generated from time to time will have a great amount of correlation. Such a phenomenon is harmful to security since once an eavesdropper happens to have a secret key, the key might be used to predict the other keys. Therefore, channel reciprocity based physical layer security schemes should be designed tolerable to the key mismatch problem, the physical reconstruction hazard, and the slow fading channel.

SUMMARY

A physical-layer scheme in LTE MIMO OFDM systems based on precoding codebooks and rotation on channel matrixes is proposed. Specifically, a Precoding-codebook-base Secure Uplink (PSU) scheme is proposed to utilize the channel reciprocity, uniqueness, and randomness in solving the secure initiation problem. The PSU scheme takes an emphasis on the uplink secrecy feedback by letting the UE to hide its secret information by choosing the precoding matrix that is applied to the uplink De-Modulation Reference Signals (DMRSs). In addition to solve the secure initiation problem, it is also possible to use the PSU scheme together with traditional encryption techniques, i.e. after initiation.

Suppose that the UE wants to transmit symmetric secret keys to the eNodeB, the UE can generate its own secret keys in a uniform random way, which overcomes the slow fading channel problem. Specifically, the secret information is hidden in the right singular matrices of the channel through codebook-based precoding operation. The UE partitions the secret information and maps into Precoding Matrix Index (PMI) in the LTE precoding codebooks where each precoding matrix in the codebook can be used as a quantization point for the space of the right singular matrices. Since the LTE standard specification has already defined its precoding codebooks (e.g., DFT codebooks and householder codebooks) for different antenna and rank settings, the PSU scheme has no need to add new codebooks into the current LTE standards. Furthermore, the eNodeB constantly rotate the Cell-Specific Reference Signals (CRSs) so that the rotated channel imposes difficulties for the eavesdroppers to predict the eNodeB-to-UE channel by reconstructing physical environments.

Apart from emphasizing uplink secrecy feedback, the PSU scheme is different in terms of using a distinct vector-wise chordal distance measure to enhance the tolerance to noise and generality of the system. The PSU scheme is also backward compatible and does not affect the channel estimation of legacy UEs or those UEs that do not support such a security feature.

Other embodiments and advantages are described in the detailed description below. This summary does not purport to define the invention. The invention is defined by the claims.

DETAILED DESCRIPTION

Reference will now be made in detail to some embodiments of the invention, examples of which are illustrated in the accompanying drawings.

To establish a secure connection, communication systems should provide a mechanism from the mutual authentication and secret key sharing between the mobile users and the network. In particular, the Evolved Packet System (EPS) has an Authentication and Key Agreement (AKA) procedure that allows the serving network (SN) and user equipment (UE) to authenticate each other and agree on a symmetric key for the future data encryption and decryption.

Figure 1A:
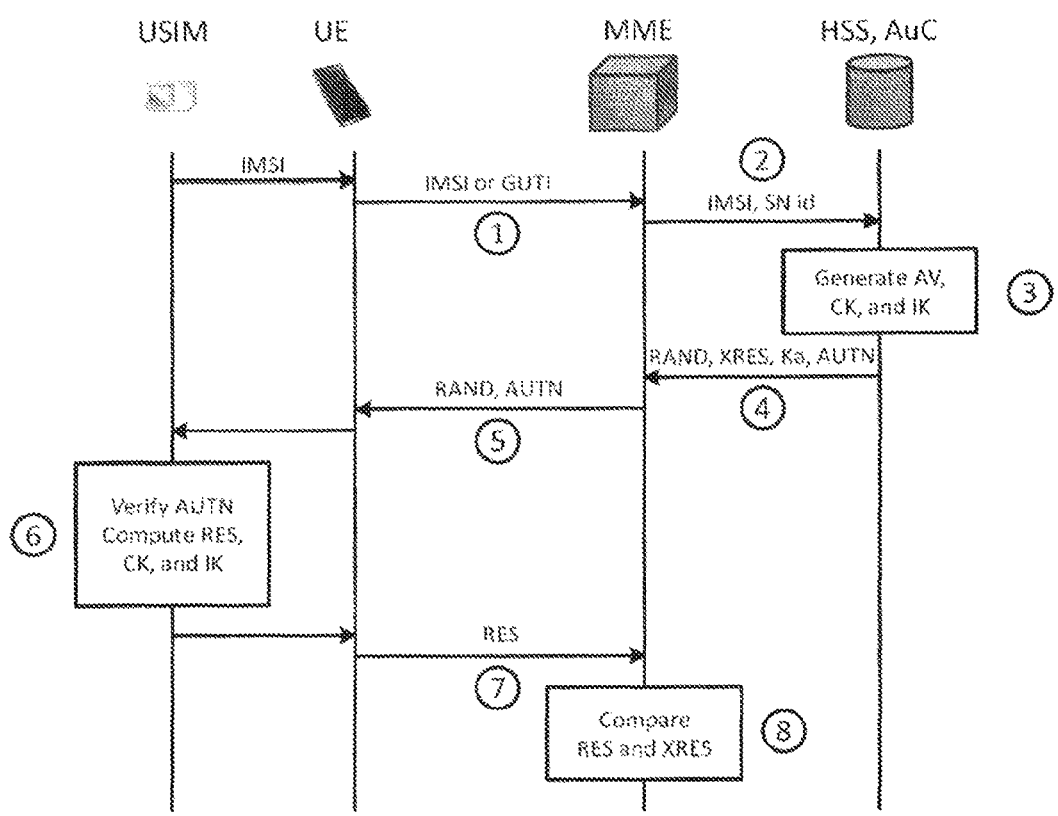
FIG. 1A illustrates an EPS Authentication and Key Agreement (AKA) procedure.

FIG. 1A illustrates the EPS AKA procedure in an LTE network. The LTE network comprises a UE, an MME, and an HSS/AuC. In step 1, the UE transmits its IMSI or GUTI through the wireless medium and backbone to the MME. Note that the IMSI is originally stored in a tamper resistant Universal Subscriber Identity Module (USIM). In step 2, the MME forwards the IMSI and its Serving Network (SN) ID to a Home Subscriber Server (HSS) of the UE. In step 3, the HSS verifies the identity of the MME through SN ID and the identity of the UE through IMSI with the help of an Authentication Center (AuC). The HSS and AuC together generate a cipher key (CK), an integrity key (IK), and an authentication vector (AV) which consists of a random sequence (RAND), an expected response (XRES), a local master key (Ka), and an authentication token (AUTN). Note that the Ka is binding to the SN ID as an implicit SN authentication. In step 4, the HSS sends the AV to the MME. In step 5, the MME uses the Ka to derive the CK and the IK if it has the correct SN ID. The MME then challenges the UE by sending the RAND and the AUTN. In step 6, the USIM first verifies the AUTN. If the AUTN is correct, the USIM then takes the AUTN and the RAND as input to generate a response (RES), the CK, the IK, and the Ka. In step 7, the UE sends the RES to the MME. Finally, in step 8, the MME checks if the RES from the UE matches the XRES from the HSS and AuC. If they match, then the connection is established.

Due to the AKA procedure, the EPS is much securer than the GSM, GPRS, and its predecessor, Universal Mobile Telecommunications System (UMTS). However, there are still some security problems existing in the EPS AKA procedure, which is referred to as the secure initiation problem in the BACKGROUND. In order to solve the secure initiation problem, the UE needs to have the capability of concealing its confidential messages (e.g., IMSI, GUTI, RAND, and AUTN) so that only the authorized eNodeB or SN instead of the eavesdropper can obtain them.

A conventional way of dealing with the problem is to apply the asymmetric cryptography for its merit of separating public and private keys. However, even though it is really impossible to find solutions in polynomial time, there are still main drawbacks of the asymmetric cryptosystems: 1) the complexity of encryption and decryption even with the knowledge of the keys may not be tolerable for mobile devices due to power and computation speed limitation; 2) the protection of the secret messages is greatly compromised in asymmetric cryptosystems, for example, RSA; 3) the restricted infrastructure of using the same asymmetric cryptosystems brings too much overhead and burden in coordination and implementation. In the consequence of the drawbacks, security can be achieved in the physical layer.

It is information-theoretically possible to securely transmit confidential messages from the transmitter to the legitimate receiver by merely channel coding techniques if the channel from the transmitter to the eavesdropper is a degraded version of that from the transmitter to the legitimate receiver. The channel coding schemes aiming at providing security are named secrecy channel coding. Particularly, the security is achieved in the sense that even though the channel coding methods are revealed to the eavesdropper, she is still not be able to obtain any information from the confidential messages. This kind of security is referred to as perfect secrecy. Through the years, the theoretic bounds on secure information have been investigated in different channel assumptions such as broadcast channels, Gaussian channels, fading channels, and MIMO channels. Although some researchers have proposed illustrations of using LDPC codes for secrecy channel coding, there are no practical schemes developed to provide security in the physical layer.

Apart from hiding secret messages through channel coding, another research direction on physical layer security is to establish secret key agreements between the transmitter and the legitimate receiver. This kind of physical layer security primarily looks into generating secret keys via correlated randomness that is usually extracted from the wireless channel in between. Then cryptography algorithms can use those keys to protect system security. There are two main steps, information reconciliation and privacy amplification. In the information reconciliation phase, two legitimate users respectively generate random sequences based on the observation of their channel. Ideally, they are supposed to obtain the same random sequences. However, because of the channel estimation error, noise, and interference, the sequences will not coincide with each other. Public discussion is thus needed. The two users reveal some information regarding their sequences through a broadcast channel where eavesdropping could happen. They then use the information to make their sequences identical. However, the portion of information transmitted through the broadcast channel in this case is not secure anymore. Therefore, in the privacy amplification phase, the two users eliminate that information by using, for example, universal hash function to obtain the secret keys that are identical and have no information exposed to the possible eavesdroppers. Then the symmetric cryptography algorithms can be applied by using those secret keys. As a result, the physical layer security on secrecy sharing is unlike the one on secrecy channel coding that does not consist of any cryptography algorithms. It resorts to the symmetric cryptosystems to achieve security. Interestingly, such a design feature is closely related to the secure initiation problem in which secure communications can only be established after the sharing of confidential IMSI, random challenge sequences, secret keys, etc. Hence, a precoding-codebook-based secure uplink (PSU) scheme is proposed, which is built on top of the ideas of secrecy sharing through physical layer security.

Figure 1B:
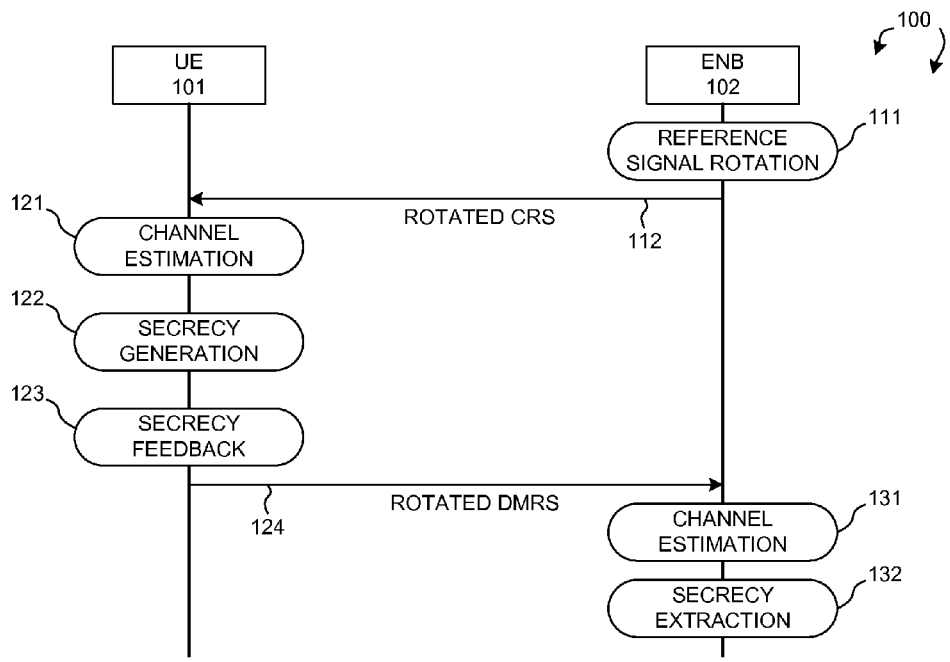
FIG. 1B illustrates a precoding-codebook-based secure uplink (PSU) procedure in a mobile communication system in accordance with one novel aspect.

FIG. 1B illustrates a precoding-codebook-based secure uplink (PSU) procedure in a mobile communication system 100 in accordance with one novel aspect. Mobile communication system 100 comprises a user equipment UE 101 and a base station eNodeB 102. In step 111, eNodeB 102 generates a rotated reference signal. In step 112, eNodeB 102 transmits the rotated reference signal to UE 101. In step 121, UE 101 performs channel estimation based on the received reference signal. In step 122, UE 101 performs secrecy generation, which matches the secret information to a plurality of PMIS in a predefined codebook corresponding to a plurality of precoding matrices. UE 101 then maps the precoding matrices on REs corresponding to the position of DMRSs. In step 123, UE 101 performs secrecy feedback, which generates a rotated version of DMRSs based on the left singular matrix of the estimated channel. In step 124, UE 101 transmits the rotated DMRSs to eNodeB 102. In step 131, eNodeB 102 obtains channel estimation based on the received DMRSs. In step 132, eNodeB 102 performs secrecy extraction and extracts the secret information based on a vector-wise chordal distance measure.

Figure 2:
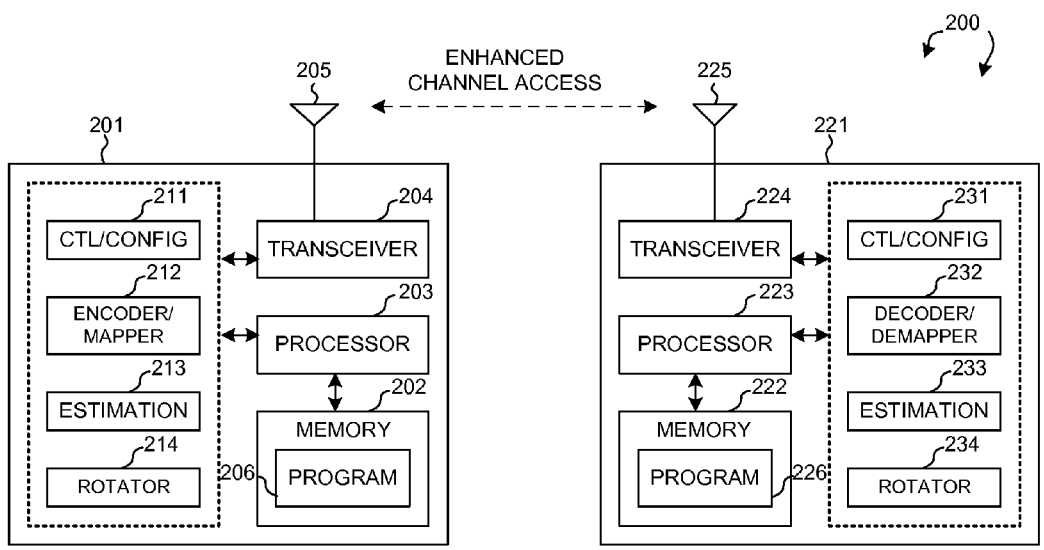
FIG. 2 illustrates simplified block diagrams of a user equipment and a base station in a wireless system in accordance with one novel aspect.

FIG. 2 illustrates simplified block diagrams of a user equipment 201 and a base station 221 in a wireless system in accordance with one novel aspect. UE 201 comprises memory 202, a processor 203, an RF transceiver 204, and an antenna 205. RF transceiver 204, coupled with antenna 205, receives RF signals from antenna 204, converts them to baseband signals and sends them to processor 203. RF transceiver 204 also converts received baseband signals from processor 203, converts them to RF signals, and sends out to antenna 205. Processor 203 processes the received baseband signals and invokes different functional modules to perform features in UE 201. Memory 202 stores program instructions and data 206 to control the operations of UE 201. The program instructions and data 206, when executed by processor 203, enables UE 201 to perform precoding-codebook-based secure uplink transmission according to novel aspects of the invention.

UE 201 also comprises various function modules including a control and configuration module 211 that receives control and configuration information from the network, an encoding and mapping module 212 that encodes UE secrecy information to PMIS and then mapping corresponding precoding matrices to DMRSs, a channel estimation module 213 that performs downlink channel estimation, and a rotator that rotates UE reference signals (DMRSs) to be sent to the network. The different components and modules may be implemented in a combination of hardware circuits and firmware/software codes being executable by processor 203 to perform the desired functions. Similarly, eNodeB 221 comprises memory 222, a processor 223, a transceiver 224 coupled to one or multiple antennas 225, and eNodeB 221 also comprises various function modules including a control and configuration module 231, a decoder/de-mapper 232 that extracts UE secrecy information, a channel estimation module 233 that performs uplink channel estimation, and a rotator 234 that rotates eNodeB reference signals (CRSs) to be sent to UEs.

Figure 3A:
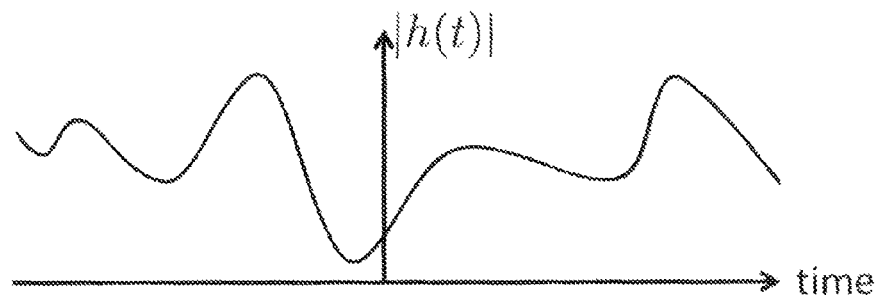
FIGS. 3A-3C illustrate channel characteristics for applying PSU in a wireless system.
Figure 3B:
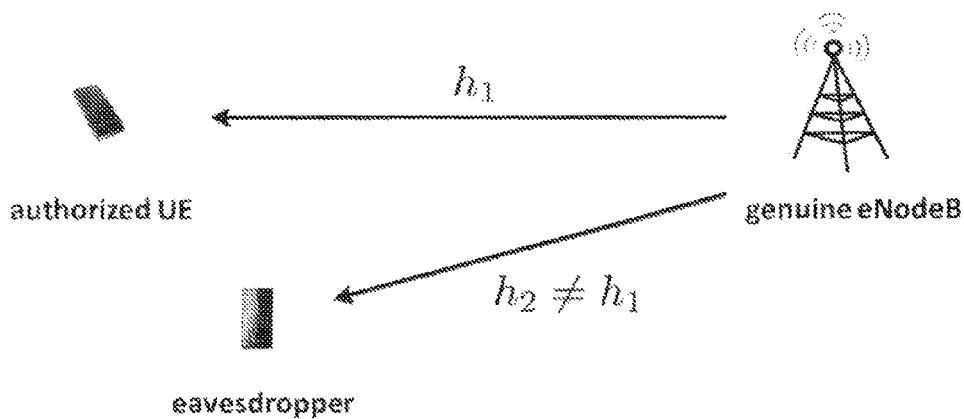
Figure 3C:
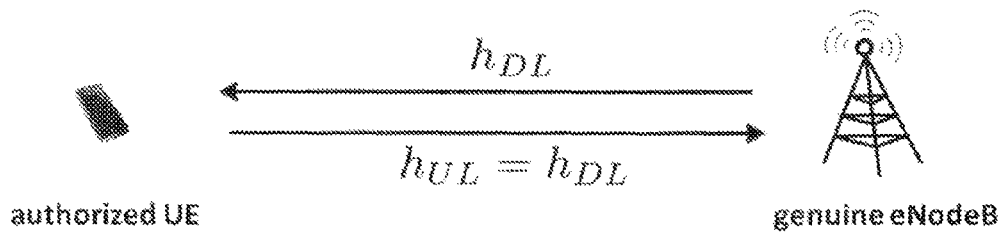

FIGS. 3A-3C illustrate channel characteristics for applying PSU in a wireless system. PSU scheme utilizes the channel reciprocity, uniqueness and randomness in solving the secure initiation problem. FIG. 3A illustrates the randomness if a channel, e.g., the channel response |h(t)| various randomly with time, which masks the secret information. FIG. 3B illustrates the uniqueness of a channel, e.g., the channel response h1 from a genuine eNodeB to an authorized UE is different from the channel response h2 from the genuine eNodeB to an eavesdropper (h2≠h1), which prevents eavesdropping. FIG. 3C illustrates the channel reciprocity, e.g., the channel response $h_{UL}$ of an uplink (UL) channel is equal to the channel response $h_{DL}$ of a corresponding downlink (D1) channel ($h_{UL}=h_{DL}$), which ensures the correct delivery.

Figure 4:
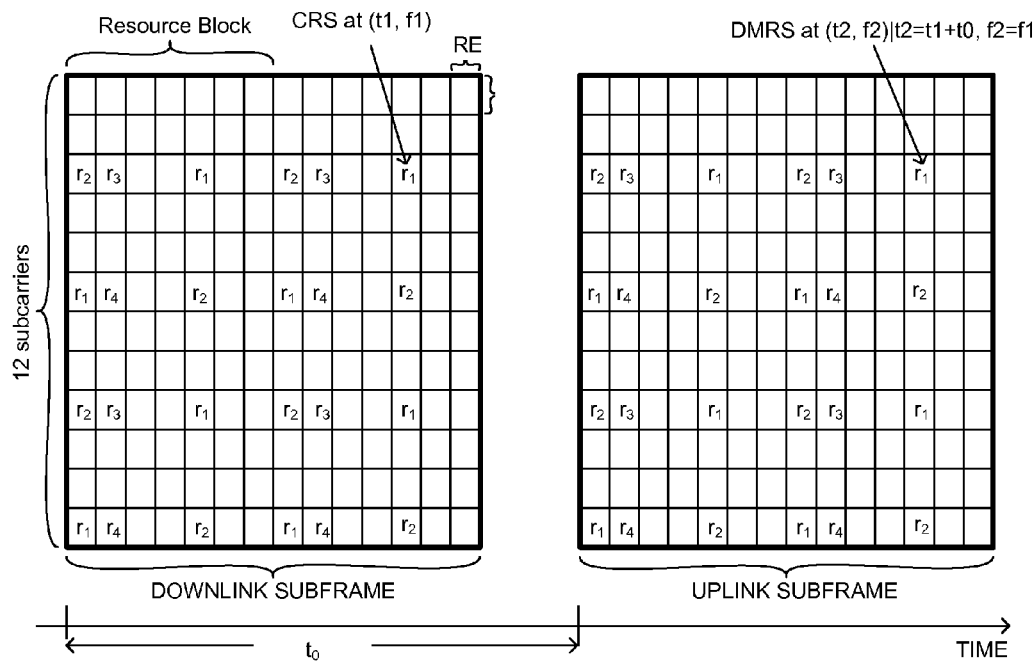
FIG. 4 illustrates the transmission of CRS and DMRS for downlink and uplink channel estimation for applying PSU in a wireless system.

FIG. 4 illustrates the transmission of CRS and DMRS for downlink and uplink channel estimation for applying PSU in a wireless system. Consider a simple LTE network where there are an eNodeB, a UE, and an eavesdropper. Assume that the eNodeB, the UE, and the eavesdropper respectively have M, N, and K antennas. In the LTE MIMO-OFDM system, modulated symbols are allocated on resource elements (REs) along time and frequency indices. The PSU scheme requires both the eNodeB and the UE to do channel estimation. In the downlink channel, the eNodeB transmits cell-specific reference signals (CRSs) on some REs within every resource block. Every transmit antenna has its own dedicated CRSs that are QPSK symbols known to the UEs. Suppose that the CRSs are scheduled on the REs with index set T1 in time and F in frequency. In the uplink channel, the UE uses Zadoff-Chu sequences to generate uplink demodulation reference signals (DMRSs). Suppose that the UE transmits DMRSs of which the frequency index set is the same as that of the CRSs, i.e., F, and the time index set T2 corresponds to that of the CRSs but with a delay t0, i.e., T2={t+t0|t ∈T1}.

Figure 5:
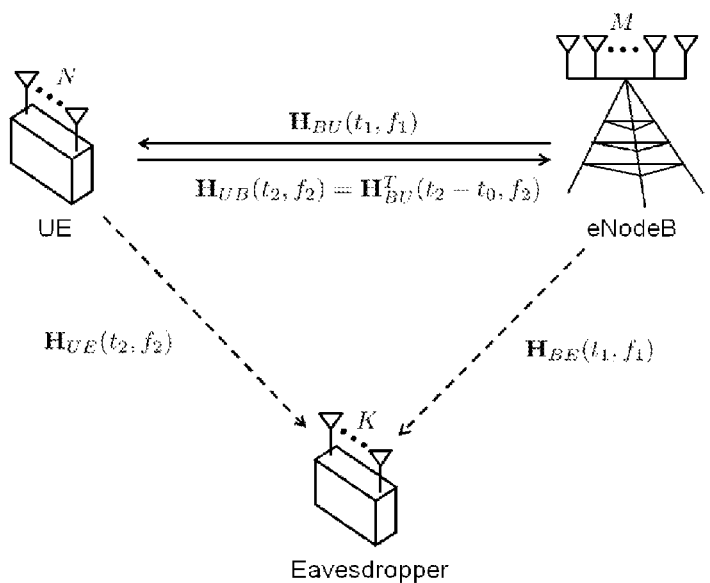
FIG. 5 illustrates different channel response matrixes between a UE, an eNodeB, and an eavesdropper for applying PSU in a wireless system.

FIG. 5 illustrates different channel response matrixes between a UE, an eNodeB, and an eavesdropper for applying PSU in a wireless system. Denote the downlink channel matrix from the eNodeB to the UE as $H_{BU}(t1, f1) \in C^{N \times M}$ where the subscripts B and U stand for eNodeB and UE respectively, t1∈T1 is the time index, and f1∈F is the frequency Index. Assume that the system is Time Division Duplex (TDD) so that the channel reciprocity between the uplink and downlink holds. In order to fully utilize channel reciprocity, the delay t0 must be less than channel coherence time. For example, if the UE moves with a speed of 3 km/h, the channel coherence time is about 76 ms according to the formula given by $T_d=0.423/f_d$, where $f_d$ is the Doppler frequency. Such coherence time is much longer than the 10 ms radio frame. The channel experienced in this time interval is therefore approximately the same. As a result, let the uplink channel matrix be $H_{UB}(t2, f2)=H_{BU}^T(t1, f1)|_{(t1=t2-t0, f1=f2)}$, where t2∈T2 and f2∈F. Note that subscript 1 and 2 are used to represent the downlink and uplink channel estimation respectively. Assume that the eavesdropper is a passive listener. As illustrated in FIG. 5, let the channel matrix from the eNodeB to the eavesdropper and that from the UE to the eavesdropper be denoted by $H_{BE}$ (t1, f1) $\in C^{K \times M}$ and $H_{UB}$ (t2, f2) $\in C^{K \times N}$ respectively.

Since the eNodeB has sufficient power and can conduct CRS boosting, the downlink channel estimation is assumed ideal. However, the eNodeB cannot obtain perfect uplink channel estimation since the UE, as a mobile device, has limited power in transmitting DMRSs. To model estimation errors, suppose that the eNodeB receives DMRSs from the UE for t2∈T2 and f2∈F given by $$Y_B(t2, f2) = H_{UB}(t2, f2)\gamma(t2, f2) + N_B(t2, f2) \quad (1)$$

$$= H_{UB}(t2, f2)\begin{bmatrix} r_1(t2, f2) & \cdots & 0 \\ \vdots & r_2(t2, f2) & \vdots \\ 0 & \cdots & r_N(t2, f2) \end{bmatrix} + N_B(t2, f2)$$

Where
- γ(t2, f2) is an diagonal matrix with entries $r_1$ (t2, f2) ... $r_N$(t2, f2) being the DMRSs of transit antenna 1 to N respectively;
- $N_B$ is an M by N noise matrix of which entries are i.i.d. zero-mean Gaussian random variables with variance $\sigma_N^2$.

Let the DMRSs have equal power P, i.e., $|r_1(t2, f2)|^2= \ldots =(r_N(t2, f2)|^2=P$. Note that we assume that γ(t2,f2) is diagonal for convenience, but an orthogonal matrix would be sufficient. Since the DMRSs are known to the eNodeB, the estimate of the uplink channel turns out to be $$\hat{H}_{UB}(t2,f2)=PH_{UB}(t2,f2)+N'_B(t2,f2) \quad (2)$$

Where
$N'_B(t2,f2)=PN_B(t2,f2)\gamma^{-1}(t2,f2)$ still has entries as i.i.d. zero-mean $\sigma_N^2$-variance Gaussian random variables.

The proposed PSU scheme is related to limited feedback precoding. Precoding operation in MIMO systems can take advantage of the diversity and multiplexing gains. In the conventional precoding operation at time and frequency (t,f), the eNodeB multiplies source signal vectors $x(t,f) \in C_s^{n_s(t,f) \times 1}$ by an orthogonal precoding matrix $F_C(t,f) \in C^{M \times n_s(t,f) \times 1}$ before transmission. Here, the subscript C in $F_C(t,f)$ denotes the conventional precoding matrix, and $n_s(t,f)$ is the transmission rank. The UE then gets the signal $y(t,f)=H(t,f)F_C(t,f)x(t,f)+n(t,f)$ where n(t,f) is a Gaussian noise vector with the covariance matrix $\sigma_N^2 I$. The MIMO capacity turned out to be $$C_{MIMO}(t, f) = \quad (3)$$
$$\text{logdet}\left(I_N + \frac{P_x(t, f)}{\sigma_n^2 n_s(t, f)} H_{BU}(t, f) F_c(t, f) R_x(t, f) F_C^H(t, f) H_{BU}^H(t, f)\right)$$

Where
- $R_x(t,f)$ is the correlation matrix of the source vectors, i.e., $E[x(t,f)x^H(t,f)]$.
- $P_x(t,f)$ is the transmission power (i.e., trace($R_x(t,f)$)).

By matching $F_C(t,f)$ to the right singular matrix of $H_{BU}(t,f)$, every orthogonal column $F_C(t,f)$ spans the space of a respective sub-channel. The transmitter thus can efficiently control its transmitting power on each sub-channel through water filling. In order to fully apply precoding operation, the transmitter has to know the channel matrices to the receiver.

However, directly feeding back the complex-valued channel matrices would result in a big feedback overhead in FDD systems where channel reciprocity is not valid.

Therefore, in limited feedback systems, the receiver sends PMIS in a precoding codebook instead. The precoding codebook is also known to the transmitter so that it can find the precoding matrices corresponding to the PMIS obtained from the receiver. Those precoding matrices in the codebook can be regarded as channel quantization. Hence, we connect the concept of quantization in the precoding codebook with secrecy sharing in physical layer security and propose to hide the confidential message in precoding matrices through the uplink channel. Note that in a TDD uplink downlink system where channel reciprocity is applicable, PMI feedback would be unnecessary. However, if the precoding codebook is preserved for FDD systems, it can still be used in the PSU scheme.

Figures 6, 7:
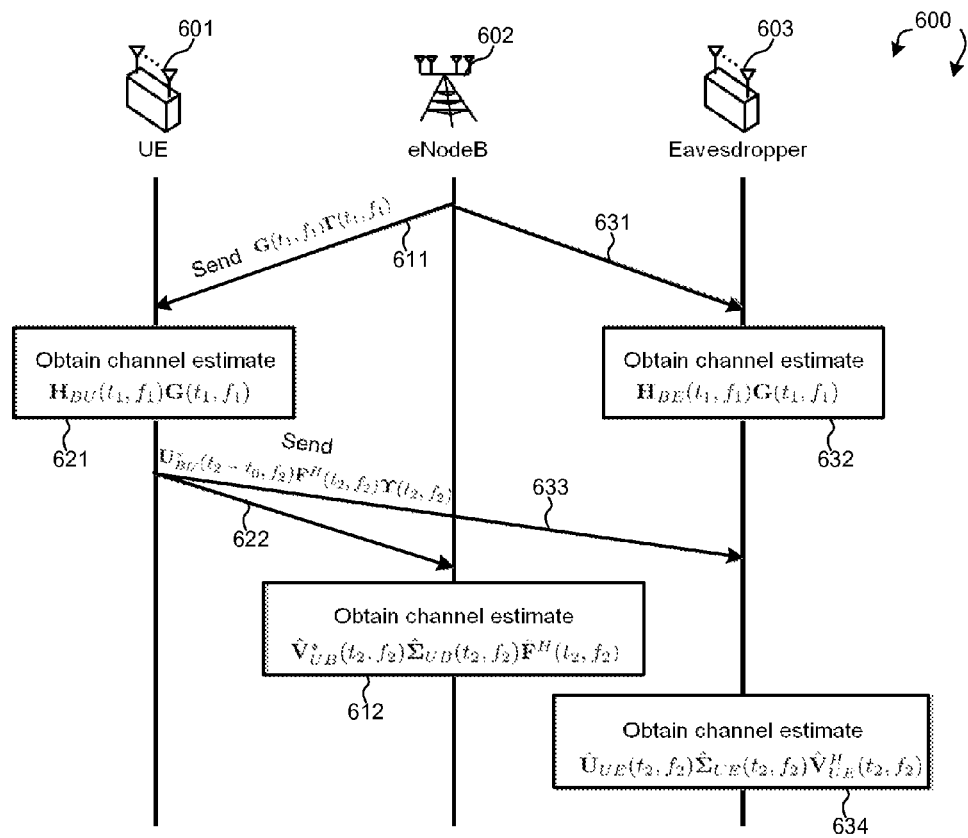
FIG. 6 illustrates one embodiment of a procedure for applying PSU in a wireless system.
FIG. 7 illustrates one embodiment of encoding secrecy information onto reference signals via precoding matrix indexes (PMIS).

FIG. 6 illustrates one embodiment of a procedure for applying PSU in a wireless system 600. Wireless system 600 comprises a UE 601, an eNodeB 602, and an eavesdropper 603. Suppose that the codebook is of size n, which has $2^n$ PMIS corresponding to $2^n$ unitary precoding matrices with dimension N. For example, the codebook can be denoted by $CB=\{F_1 \ldots F_{2^n}\}$, with unitary precoding matrices $F_i \in \mathbb{C}^{N \times N}$ for $i=1, 2 \ldots 2^n$.

The first main step is Reference Signal Rotation performed by eNodeB 602. In step 611, the eNodeB sends randomly rotated CRSs $G(t1,f1)\Gamma(t1,f1)$, where $G(t1,f1)$ is a unitary matrix only known by the eNodeB and $\Gamma(t1,f1)$ is the CRS matrix known to the UE. For a fixed time t1, $G(t1,f1)$ is randomly generated among $f1 \in F$. For a fixed frequency f1, the eNodeB can randomly renew $G(t1,f1)$ periodically. The rotation of the original CRS is to further confuse the eavesdropper. In step 621, based on the received rotated reference signal $G(t1,f1)\Gamma(t1,f1)$, the UE obtains the perfect channel estimation given by $$H_{BU}(t1,f1)G(t1,f1)=U_{BU}(t1,f1)\Sigma_{BU}(t1,f1)V_{BU}^H(t1,f1)G(t1,f1) \quad (4)$$

Where $U_{BU}(t1,f1)\Sigma_{BU}(t1,f1)V_{BU}^H(t1,f1)$ is the Single Value Decomposition (SVD) of $H_{BU}(t1,f1)$.

The second main step is Secrecy Generation performed by UE 601. The UE groups its secret information into bit sequences with equal length n and matches each sequence to a PMI in the codebook corresponding to a precoding matrix. The UE then maps the precoding matrices on REs corresponding to the positions of DMRSs. Denote the assigned precoding matrices at the time and frequency (t2, f2) as $F(t2, f2) \in \{F_1 \ldots F_{2^n}\}$. FIG. 7 illustrates one embodiment of encoding secrecy information onto reference signals via precoding matrix indexes (PMIS). In the example of FIG. 7, the secret information is represented by a bit stream 0100010111101001. The secret information is then grouped into four bit sequences 0100, 0101, 1110, and 1001, each bit sequence has equal length of 4-bit (n=4). Each bit sequence is then matched to a PMI in the codebook corresponding to a precoding matrix. For example, bit sequence 0100 is mapped to Row 01 and column 00, which corresponds to a PMI for precoding matrix $F_{10}$. As a result, the entire secret information is mapped to PMIS corresponding to precoding matrices $\{F_{10}, F_{11}, F_{32}, F_{21}\}$, which is denoted as $F(t2,f2)$.

The third main step is Secrecy Feedback performed by UE 601, as depicted by step 622. At time and frequency indices (t2,f2)=(t1+t0, f1), the UE feeds a rotated version of DMRSs back to the eNodeB given by $$\tilde{Y}(t2,f2)=U^*_{BU}(t2-t0,f2)F^H(t2,f2)Y(t2,f2)$$

Where $U_{BU}(t2-t0, f2)=U_{BU}(t1, f1)$ can be obtained by SVD.

The fourth main step is Secrecy Extraction performed by eNodeB 602, as depicted by step 612. First, the eNodeB obtains the channel estimation given by $$\tilde{H}'_{UB}(t2, f2) = PH_{UB}(t2, f2)U^*_{BU}(t2-t0, f2)F^H(t2, f2) + N'_B(t2, f2) \quad (5)$$

$$= PV^*_{BU}(t2-t0, f2)\Sigma_{BU}(t2-t0, f2)U^T_{BU}(t2-t0, f2)$$

$$U^*_{BU}(t2-t0, f2)F^H(t2, f2) + N'_B(t2, f2)$$

$$= PV^*_{BU}(t2-t0, f2)\Sigma_{BU}(t2-t0, f2)F^H(t2, f2) + \quad (6)$$

$$N'_B(t2, f2)$$

$$= P\tilde{V}_{UB}(t2, f2)\tilde{\Sigma}_{UB}(t2, f2)\tilde{F}^H(t2, f2)$$

Where

Equation (5) results from the channel reciprocity (i.e., $H_{UB}(t2,f2)=H^T_{BU}(t2-t0,f2)$).

In equation (6), the SVD of $\tilde{H}'_{UB}(t2,f2)$ is $\tilde{V}(t2,f2)\tilde{\Sigma}_{UB}(t2,f2)\tilde{F}^H(t2,f2)$.

The eNodeB then extracts $\tilde{F}^H(t2,f2)$ and matches them back to the PMI $\hat{i}(t2,f2)$ corresponding to the precoding matrix $\tilde{F}(t2, f2)=F_{\hat{i}(t2,f2)} \in CB$ in the codebook. Those PMIS together form the estimate bit sequences representing the secret information from the UE.

From the above procedure, it can be seen that channel reciprocity provides a secure link between the UE and the eNodeB. Furthermore, both eNodeB and UE rotate reference signals to confuse eavesdropper 603. From the eNodeB side, instead of transmitting the regular CRSs, $\Gamma(t1,f1)$, the eNodeB adds rotation on them, $G(t1,f1)\Gamma(t1,f1)$ (see step 631). Through this step, the eNodeB confuses the eavesdropper and keeps her from obtaining the true channel between the eNodeB and the UE. On the other hand, from the UE side, the UE replaces the right singular matrix of the uplink channel matrix with the precoding matrix (see step 633). Such a replacement can also bewilder the eavesdropper. By multiplexing the original singular matrix $U^*_{BU}(t2-t0,f2)$ with precoding matrix $F^H(t2,f2)$, the spatial channel randomness property obscures the precoding matrix. Hence, by adding uncertainty in the uplink and downlink channel estimation, eavesdropper 603 cannot reconstruct the physical environments to predict the eNodeB-to-UE channel anymore. In the meanwhile, the secret information such as IMSI or symmetric keys can be hidden in the precoding matrix securely. The precoding codebooks quantize the wireless channel into unitary spaces and reduce the influence of the channel estimation error.

It can been seen that the PSU scheme only uses channel estimation, PMI mapping, and reference signal rotation. The computational complexity is low comparing to the asymmetric cryptography especially because channel estimation and PMI mapping have already been done in LTE physical layer. In addition, since the eNodeB and the UE can use the symmetric cryptography after applying the PSU scheme, the complexity of data encryption and decryption afterwards would be very low. Therefore, the PSU scheme has low complexity, low power consumption, small changes to the LTE standards, and flexibility in choosing the subsequent symmetric cryptosystems. The PSU scheme also provides backward compatibility.

Figures 8A, 8B:
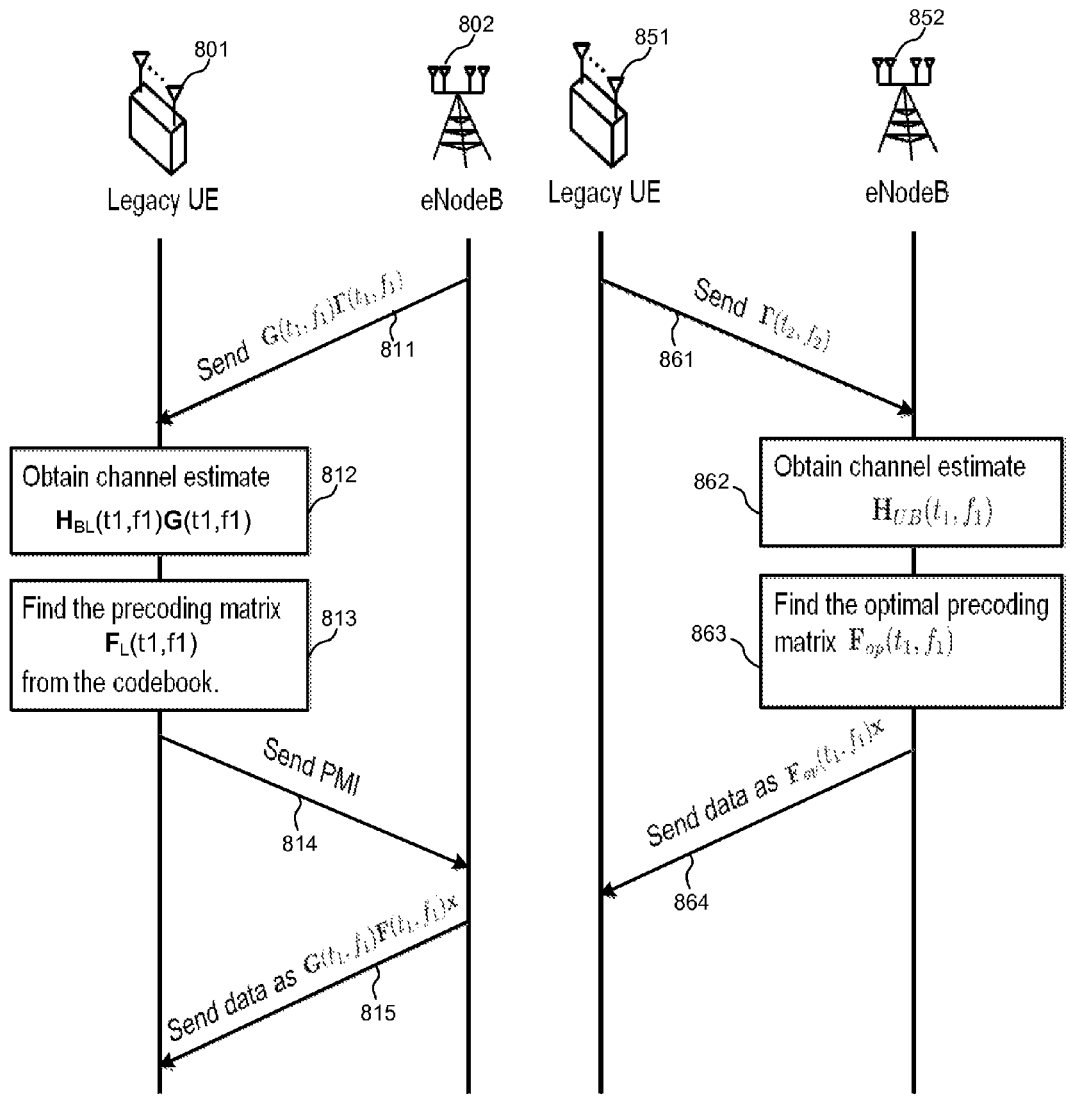
FIG. 8A illustrates backward compatibility of a PSU scheme in a FDD wireless system.
FIG. 8B illustrates backward compatibility of a PSU scheme in a TDD wireless system.

FIG. 8A illustrates backward compatibility of a PSU scheme in a FDD wireless system. Suppose that a legacy UE 801 joins the network and is served by eNodeB 802. In step

811, eNodeB 802 transmits rotated reference signals G(t1,f1)Γ(t1,f1). UE 801 has no knowledge of the PSU scheme and therefore, does not know that the downlink reference signals are rotated. In step 812, UE 801 performs channel estimation and obtains the channel as $H_{BL}(t1,f1)G(t1,f1)$, where the subscript L stands for legacy UE. In the case of FDD systems, in step 813, the legacy UE 801 finds the best precoding matrix $F_L(t1,f1)$ in the codebook that approaches the capacity by substituting $H_{BU}(t1,f1)G(t1,f1)$ for $H_{BL}(t,f)$ and $F_L(t1,f1)$ for $F_C(t,f)$ in equation (3). UE 801 then feeds back the PMI to eNodeB 802 in step 814. In step 815, eNodeB 802 transmits the source vector x by applying beamforming or multiplexing as $G(t1,f1)F_L(t1,f1)x$, which ought to give the same system throughput due to the random choice of the unitary matrix G(t,f).

FIG. 8B illustrates backward compatibility of a PSU scheme in a TDD wireless system. In TDD systems, since it is the responsibility of the legacy UE to send reference signals, the eNodeB can directly apply the reciprocity property to obtain downlink channel estimation. In step 861, legacy UE 851 sends reference signal Γ(t2,f2). In step 862, eNodeB 852 receives the reference signal and obtains channel estimation $H_{UB}(t1,f1)$. In step 863, eNodeB 852 find the optimal precoding matrix $F_{op}(t1,f1)$. In step 864, eNodeB 852 sends data as $F_{op}(t1,f1)x$. Therefore, the proposed PSU scheme is also backward compatible in TDD systems.

For better performance of secrecy extraction, we need to determine the nearest precoding matrix $\hat{F}(t2,f2)$ in the codebook to the noisy observation $\tilde{F}(t2,f2)$. For quantifying distance between precoding matrices, Chordal distance is widely adopted in the precoding operations. It is one of the distance measures in Grassmann manifolds. A Grassmann manifold of dimension m×n, denoted by G(m,n) is a set of n-dimensional subspaces in an m-dimensional space. In other words, G(m,n) is the set of m×n orthogonal matrices P where the quotient holds by right multiplying a unitary matrix on P (i.e., P=PG and G is an arbitrary n×n unitary matrix). For example, a point in G(m,1) is a unit-norm vector $p \in C^{m \times 1}$ which is equal to another unit-norm vector $q \in C^{m \times 1}$ if an only if $p=qe^{j\theta}$ for some $\theta \in [0,2\pi)$. In this case, p and q are the same point. Otherwise, they are different points in the G(m,1) Grassmann manifold. In G(m,n), for P, Q ∈ G (m,n), the chordal distance between P and Q is defined as $$d_c(P,Q) = \sqrt{n - \|Q^H P\|_F^2} = \sqrt{n - trace(P^H Q Q^H P)} = \sqrt{\sum_{k=1}^n \sin^2(\theta_k)} \quad (7)$$

Where $\theta_k$ for k=1 . . . n are the principle angles between the two subspaces spanned by the columns of P and Q.

The Grassmann manifold is closely related to the space of the precoding matrices. Consider the downlink MIMO capacity formula (3), assume that the channel matrix $H_{BU}(t,f) \in C^{N \times M}$ has SVD $U_{BU}(t,f) \Sigma_{BU}(t,f) V_{BU}^H(t,f)$ where $U_{BU}(t,f) \in C^{N \times N}$ and $V_{BU}(t,f) \in C^{M \times M}$ are unitary matrices, and $\Sigma_{BU}(t,f) \in C^{N \times M}$ is a diagonal matrix with real diagonal entries aligned in a descending order. The capacity can be rewritten as $$C_{MIMO}(t,f) = \quad (8)$$

$$\log\det\left(I + \frac{P_x(t,f)}{\sigma_n^2 n_s(t,f)} F_C^H(t,f) V_{BU}(t,f) \Sigma_{BU}^2(t,f) V_{BU}^H(t,f) F_C(t,f) R_x(t,f)\right)$$

In order to, for example, transmit on the L best subchannels (i.e., select the L largest singular values in Σ(t,f)), the precoding matrix $F_C(t,f)$ has to match the subspace spanned by the corresponding columns of $V_{BU}(t,f)$. Since $F_C(t,f)$ only needs to be an orthonormal spanning matrix of the subspace, it is clear that choosing the precoding matrix $F_C(t,f)G$ for an arbitrary unitary matrix G is equivalent to choosing $F_C(t,f)$. Therefore, finding precoding matrices is equivalent to finding points in the Grassmann manifold.

Chordal distance does meet the needs of measuring how long two precoding matrices separate from each other in the conventional precoding operation. The nearest precoding matrix is found by taking the PMI with the corresponding precoding matrix satisfying $$\hat{i}(t2,f2) = \arg\min_{i \in [1, \ldots, 2^n]} d_c(\tilde{F}(t2,f2), F_i) \quad (9)$$

However, chordal distance fails to be a good distance measure in the PSU scheme. For example, since the precoding matrices in the PSU scheme are square, those full-rank precoding matrices are counted as one point in the Grassmann manifold by applying chordal distance on them. Such a concept works for the conventional precoding operation since full-rank transmission chooses all the singular value of the channel matrices and every unitary matrix can do it. However, the PSU scheme needs a distance measure to distinguish different precoding matrices even in the full-rank case.

To solve the problem, observe that although the PSU scheme seems to be closely connected to the precoding operation, it is more related to the SVD operation. Specifically, the SVD operation is unique as long as there are no zero singular values, which is true with probability one for random generated channel matrices. However, the uniqueness is in the sense that every corresponding right and left singular vector pairs can have an equal but arbitrary phase shift or that their respective spanned one-dimensional subspaces are invariant. In other words, the SVD of the downlink channel matrix with M>=N can be written as $$H_{BU}(t,f) = U_{BU}(t,f) \Sigma_{BU}(t,f) V_{BU}^H(t,f) \quad (10)$$

$$= [e^{j\theta_1} u_1 \; e^{j\theta_2} u_2 \; \ldots \; e^{j\theta_N} u_N] \begin{bmatrix} s_1 & \ldots & 0 & 0 & \ldots & 0 \\ \vdots & s_2 & & \vdots & & \\ 0 & \ldots & s_N & 0 & \ldots & 0 \end{bmatrix}$$

$$[e^{j\theta_1} v_1 \; e^{j\theta_2} v_2 \; \ldots \; e^{j\theta_N} v_N \; v_{N+1} \; \ldots \; v_M]^H$$

Where $\theta_1, \ldots \theta_N \in [0,2\pi)$.

As a result, even if there is no noise involved, the resulting $\tilde{F}(t2,f2)$ will not be equal to F(t2,f2) but with phase differences along each columns. In view of the fact that every left or right singular vector should span the same one-dimensional subspace as the original after SVD, it is proposed that the nearest PMI can be found by $$\hat{i}(t2,f) = \arg\min_{i \in [1, \ldots, 2^n]} d_v(\tilde{F}(t2,f2), F_i) \quad (11)$$

With a vector-wise chordal distance measure defined as $$d_v(\tilde{F}(t2,f2), F_i) = \sqrt{\sum_{k=1}^N (1 - |[\tilde{F}(t2,f2)]_k^H [F_i]_k|^2)} \quad (12)$$

Where $[\tilde{F}(t2,f2)]_k$ and $[F_i]_k$ are the respective kth column vector of $\tilde{F}(t2,f2)$ and $F_i$.

The vector-wise chordal distance measure is introduced to lower the influence of the noise in channel estimation stage.

Simulation results show performance gain brought by this vector-wise distance measure.

Simulation Results

Simulation settings are provided in Table 1. Most of the settings are based on LTE TS36.211 and TR25.996. We use the simulator, MATLAB implementation of the 3GPP Spatial Channel Model Extended (SCME). We assume that a minimum of 72 subcarriers is allocated to the UE with each subcarrier occupying 15 kHz, with a total bandwidth of 1.08 MHz. The UE speed is set to 8.3 m per second in 2×2 and 4×4 MIMO systems. The 2×2 MIMO system uses 2-bit (4 indices) and 4-bit (16 indices) DFT codebooks, while the 4×4 MIMO system uses 4-bit Householder codebook. We also assume that the eavesdropper has the same antenna settings as the eNodeB in order to take advantage of the channel correlation to break the system security.

Figure 9A:
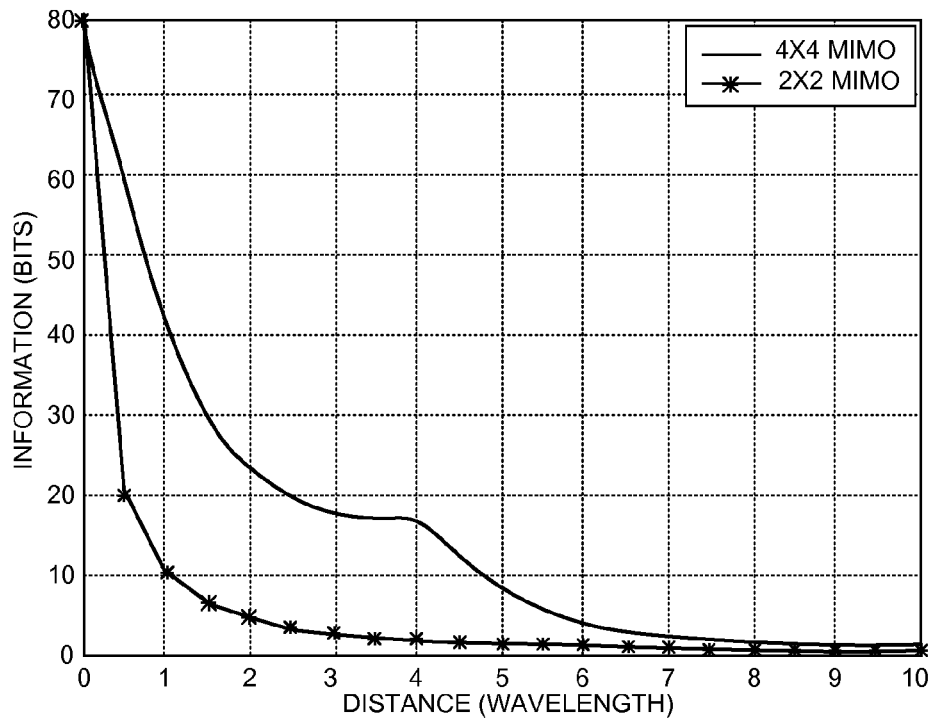
FIGS. 9A-9C illustrate the eavesdropper's capability of breaking the PSU scheme with respect to the distance in wavelengths between the eavesdropper and the eNodeB.
Figure 9B:
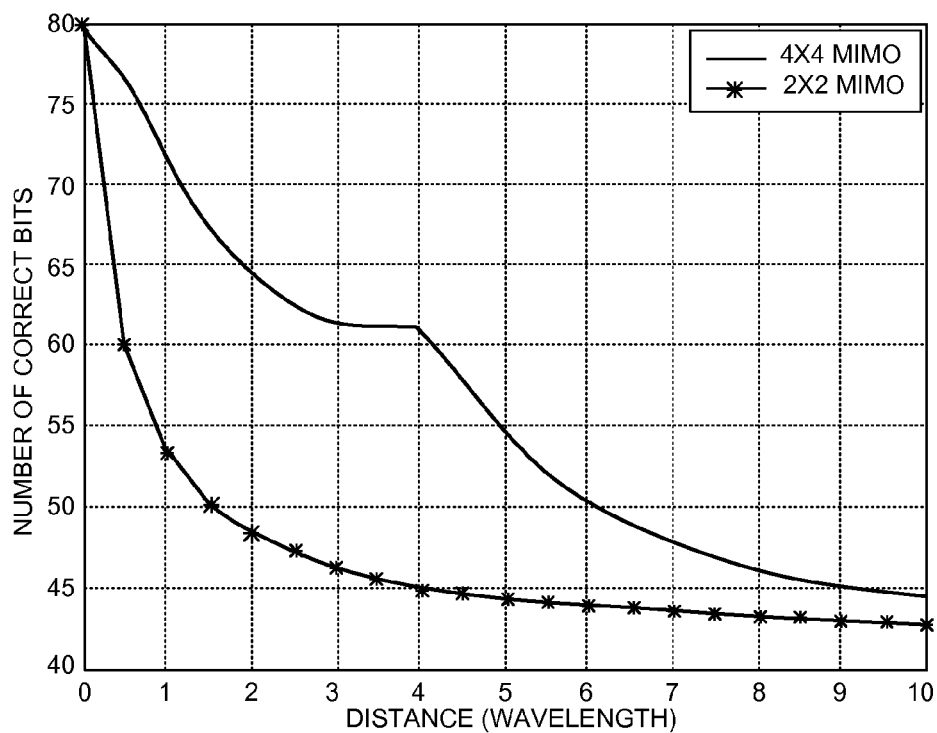
Figure 9C:
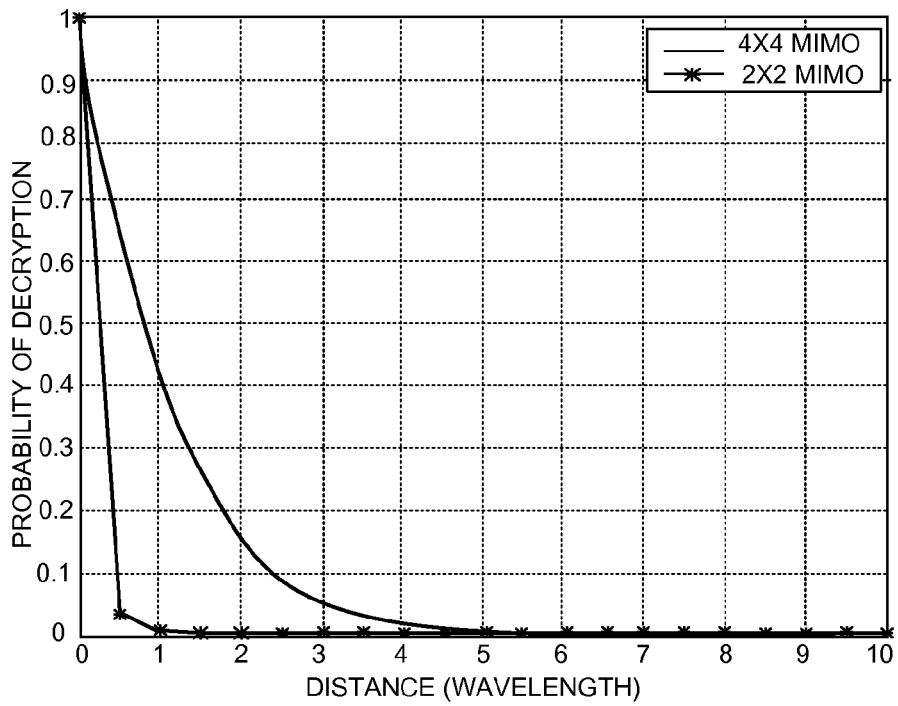
Figure 10A:
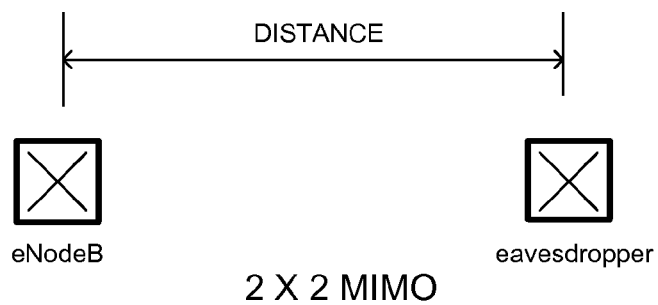
FIGS. 10A-10B illustrate the definition of distance used in the simulation results of FIGS. 9A-9C.
Figure 10B:
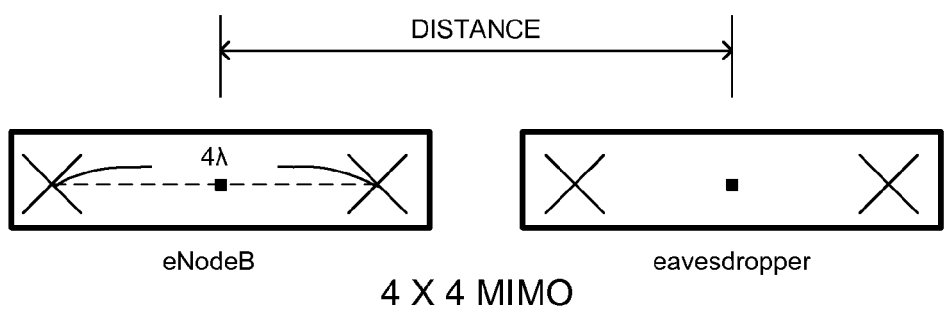

FIGS. 9A-9C illustrate the eavesdropper's capability of breaking the PSU scheme with respect to the distance in wavelengths between the eavesdropper and the eNodeB. Note that for a 2 GHz center frequency, the wavelength is about 15 cm. FIGS. 10A-10B illustrate the definition of distance used in the simulation results of FIGS. 9A-9C. Suppose that the UE wants to send an 80-bit symmetric key to the eNodeB and that there is no channel estimation error for the eavesdropper.

TABLE I

SIMULATION SETTINGS

| Parameter | Value |
|---|---|
| Channel model | SCME |
| Channel scenario | urban macro |
| MIMO | 2 × 2 and 4 × 4 |
| Center frequency | 2 GHz |
| Total bandwidth | 1.08 MHz |
| Subcarrier bandwidth | 15 kHz |
| Precoding Codebook | DFT for 2 × 2 MIMO |
| | Householder for 4 × 4 MIMO |
| Channel coding | [5, 7] convolutional codes |
| UE speed | 8.3 m/s |
| Antenna pattern | two dual-polarized elements for 4 antennas |
| | one dual-polarized element for 2 antennas |
| Antenna spacing | 4 wavelengths spacing for eNodeB |
| | 2 wavelengths spacing for UE |
| Antenna slanted dipole | 45 and −45 degree for eNodeB |
| | 0 and 90 degree for UE |

FIG. 9A shows that information-theoretically how much secret information the eavesdropper can obtain at different distance to the eNodeB. FIG. 9B shows how may bits in the key the eavesdropper can have a right guess. It shows the number of correct bits that the eavesdropper can obtain vs. eavesdropper-to-eNodeB distance. FIG. 9C shows the empirical probability of successful decryption or obtaining entirely correct secret information by the eavesdropper.

It can be observed that the 2×2 MIMO system outperforms the 4×4 MIMO system. The reason is that in our settings the eNodeB and the eavesdropper in the 4×4 MIMO system have tow dual-polarized elements separated by 4 wavelengths. The separation results in higher correlation between the UE-to-eNodeB channel and the eavesdropper-to-eNodeB channel when the eavesdropper-to-eNodeB distance is small. Specifically, at the distance of 4 wavelengths, the eavesdropper's extractable information has a local peach since a dual-polarized element from the eNodeB and another form the eavesdropper happen to overlap and, accordingly, raise the channel correlation.

Despite the high correlation when the eavesdropper is close to the eNodeB (with a distance less than 6 wavelengths or 90 cm), the overall secret information the eavesdropper can get with a distance over 10 wavelengths or 150 cm is very small. Such small amount of extractable information makes the probability of successful decryption by the eavesdropper approach zero and the portion of correct bits approximately half of the total key length. Notice that 150 cm is a short distance so that it might be possible for the eNodeB to sense the near eavesdropper. The eNodeB can either tell the UE to abandon the key or emit artificial noises to interfere the reception of the eavesdropper.

Figure 11:
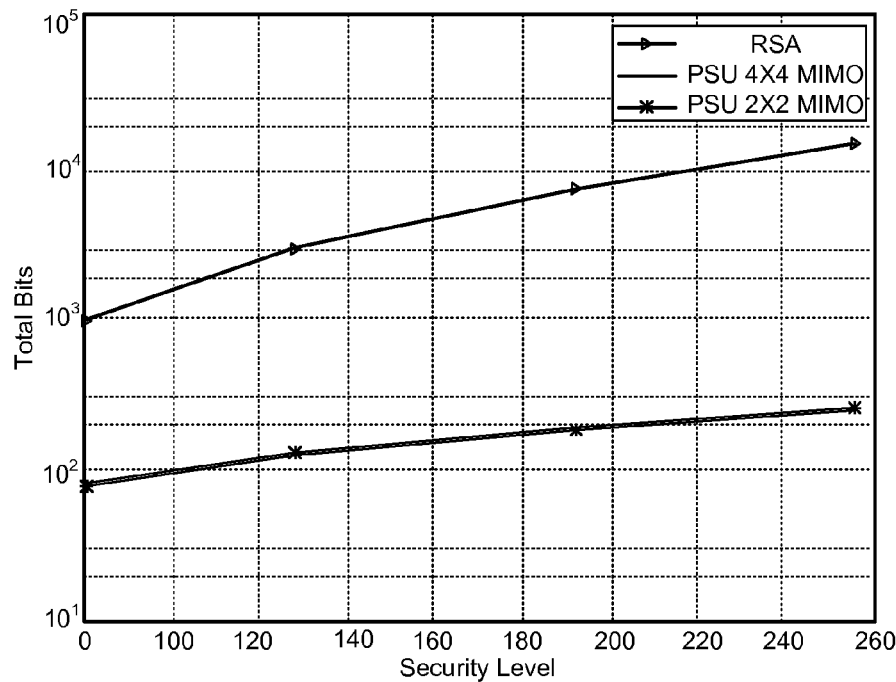
FIG. 11 shows the total bits of a secret key to be transmitted from the UE to the eNodeB in order to attain a certain secret level.

FIG. 11 shows the total bits of a secret key to be transmitted from the UE to the eNodeB in order to attain a certain secret level. The eavesdropper-to-eNodeB distance is set to 10 wavelengths. We assume that there is no channel estimation error in the network. Such a condition can occur when the UE has sufficient power to transmit reference signals or uses some channel coding schemes to protect the secret information. In can be seen that the number of information-theoretical bits the PSU scheme needs to spend is only one tenth of that of the RSA. Therefore, the PSU scheme provides a more efficient and low complexity solution to the secure initiation problem than the asymmetric cryptography.

Figure 12:
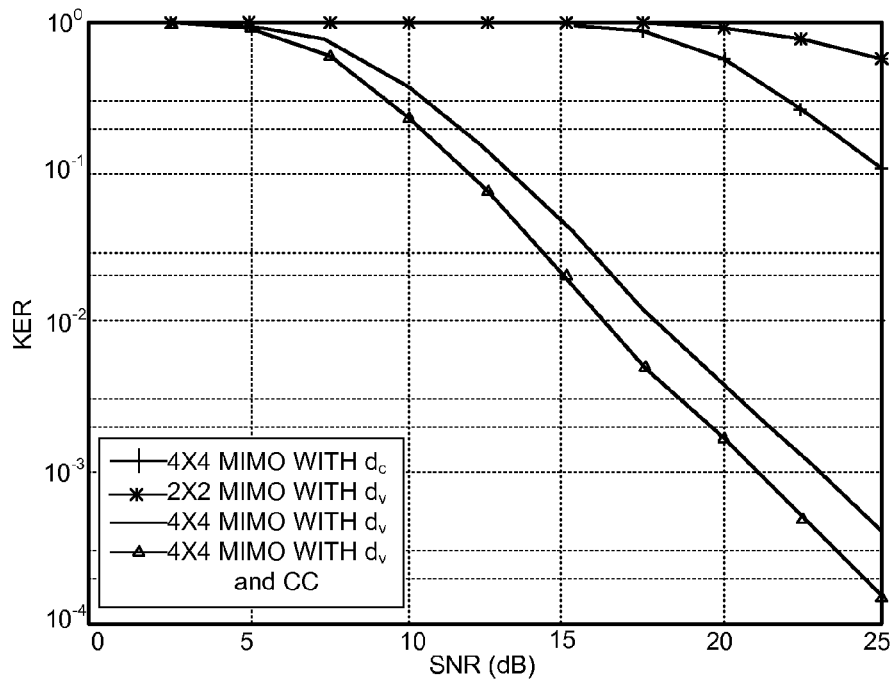
FIG. 12 shows the influence of the channel estimation error to the PSU scheme with different MIMO schemes and distance measures.

FIG. 12 shows the influence of the channel estimation error to the PSU scheme with different MIMO schemes and distance measures. Here, both the codebooks of the 2×2 and 4×4 MIMO systems have 4 bits in size or 16 precoding matrices. It can be observed that the KER is significantly lower by using the proposed vector-wise chordal distance measure ($d_v$) than the original chordal distance measure ($d_c$) in the MOPRO scheme. A KER as low as $10^{-2}$ can be achieved with SNR 18 dB. Note that there are no error correcting codes protecting the key bits from noises. The lowest curve in the figure shoes the use of convolutional codes by which ($d_v$) has 2 dB gain in SNR at the $10^{-2}$ KER. It can be expected that a stronger error correcting codes such as turbo codes or LDPC codes should achieve even lower KER. Note that the 2×2 MIMO system has a very high KER in comparison with the 4×4 MIMO system. The reason is that with the same codebook size but lower matrix dimension, the distance among precoding matrices in the codebook of 2×2 MIMO system are smaller than the 4×4 MIMO system. In consequence, small noise are enough to make the estimate of the precoding matrix diverge to other quantizations.

Figure 13:
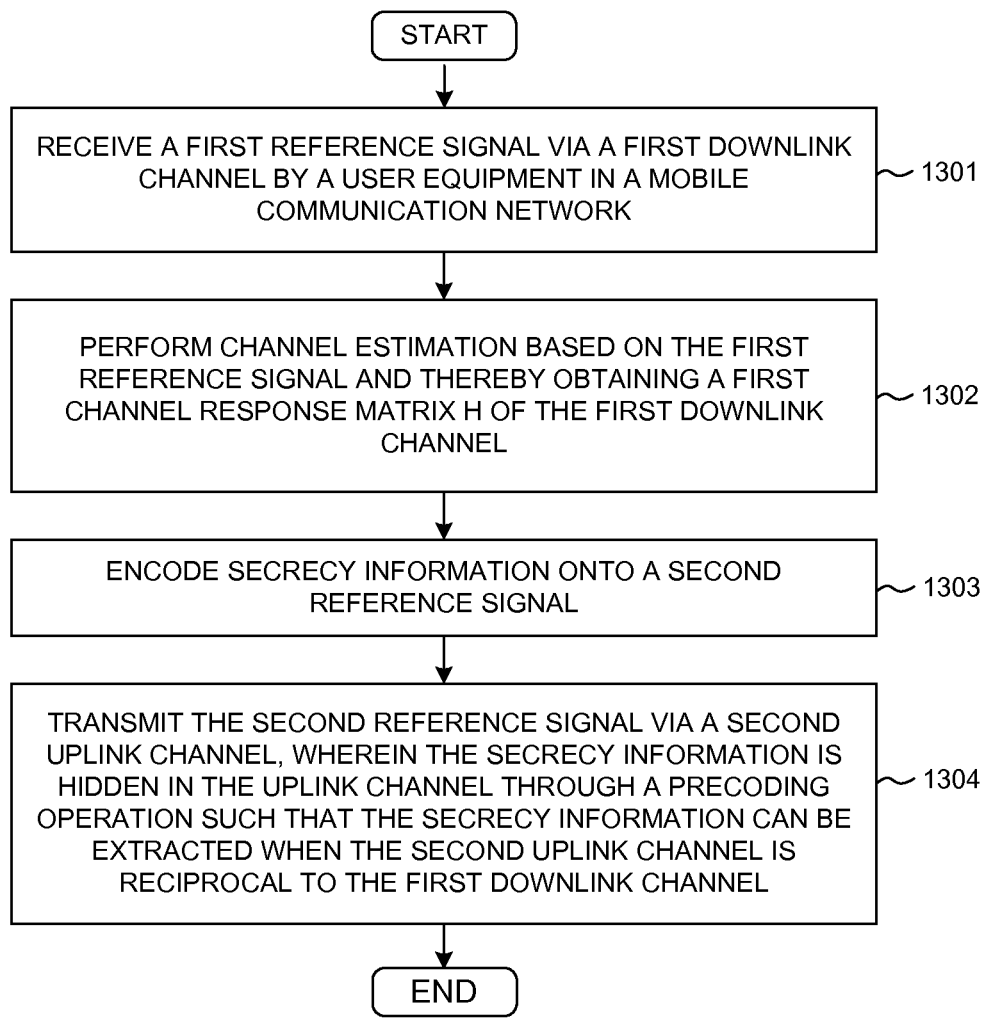
FIG. 13 is a flow chart of a method of applying the PSU scheme from UE perspective in accordance with one novel aspect.

FIG. 13 is a flow chart of a method of applying PSU from UE perspective in accordance with one novel aspect. In step 1301, a UE receives a first reference signal via first downlink channel in a mobile communication network. In step 1302, the UE performs channel estimation based on the first reference signal and thereby obtaining a first channel response matrix of the first downlink channel. In step 1303, the UE encodes secrecy information onto a second reference signal. In step 1304, the UE transmits the second reference signal via a second uplink channel. The secrecy information is hidden in the second uplink channel through a precoding operation such that the secrecy information can be extracted by the eNodeB when the second uplink channel is reciprocal to the first downlink channel. In one embodiment, the secrecy information contains a plurality of bits grouped into a number of bit sequences with equal length, and wherein each bit sequence is mapped to a Precoding Matrix Index (PMI) according to a predefined codebook.

Figure 14:
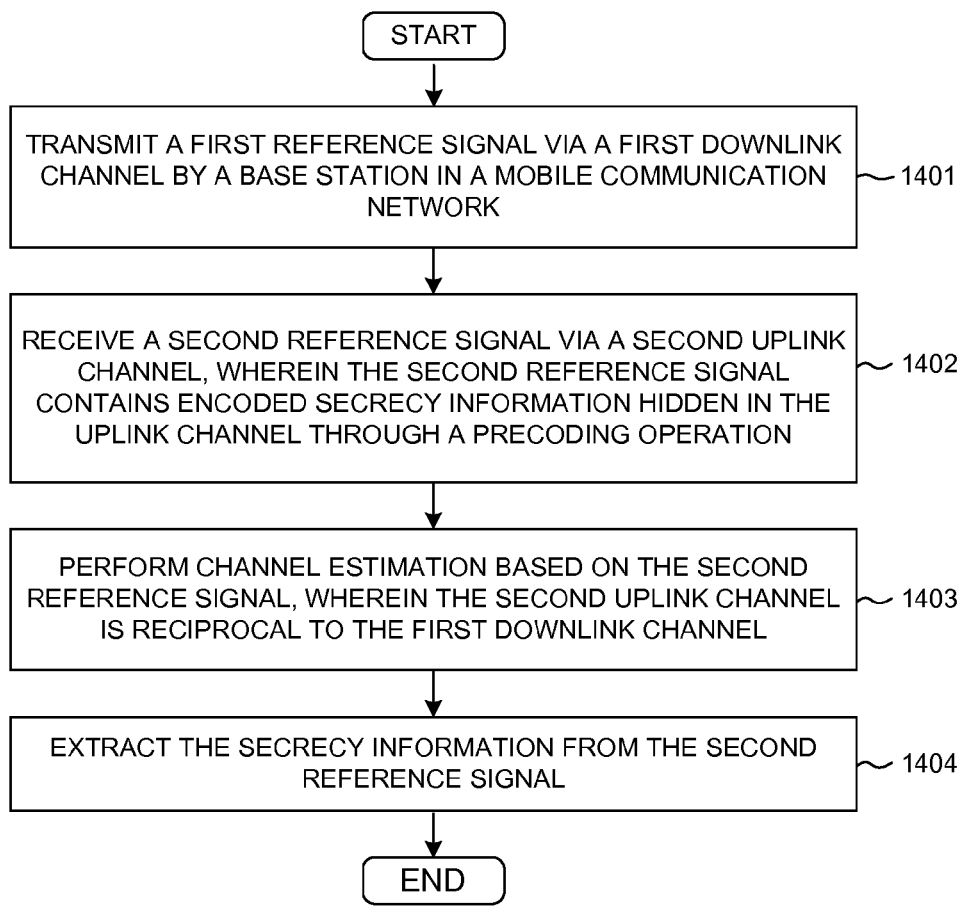
FIG. 14 is a flow chart of a method of applying the PSU scheme from eNodeB perspective in accordance with one novel aspect.

FIG. 14 is a flow chart of a method of applying PSU from eNodeB perspective in accordance with one novel aspect. In step 1401, an eNodeB transmits a first reference signal via a first downlink channel in a mobile communication network. In step 1402, the eNodeB receives a second reference signal via second uplink channel, and the second reference signal contains encoded secrecy information hidden in the second uplink channel through a precoding operation. In step 1403, the eNodeB performs channel estimation based on the second reference signal, and the second uplink channel is reciprocal to the first downlink channel. In step 1404, the eNodeB extracts the secrecy information from the second reference signal based on a vector-wise chordal distance measure.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method of Precoding-codebook-based Secure Uplink (PSU), the method comprising:
   (a) receiving a first reference signal via a first downlink channel by a user equipment (UE) in a mobile communication network;
   (b) performing channel estimation based on the first reference signal and thereby obtaining a first channel response matrix $H_{BU}$ of the first downlink channel;
   (c) generating secrecy information and encoding the secrecy information onto a second reference signal via matching the secrecy information to a plurality of precoding matrix indexes (PMIs) of the first downlink channel; and
   (d) transmitting the second reference signal via a second uplink channel, wherein the secrecy information is hidden in the second uplink channel through a precoding operation such that the secrecy information can be extracted when the second uplink channel is reciprocal to the first downlink channel, wherein the precoding operation involves generating the second reference signal based on $H_{BU}$ and the plurality of PMIs, wherein the secrecy information comprises a plurality of bits grouped into a plurality of bit sequences with equal length, wherein each bit sequence is mapped to a Precoding Matrix Index (PMI) according to a predefined codebook, wherein the second reference signal is a rotated version of Demodulation Reference Signals (DMRSs), and wherein the rotation is based at least in part on precoding matrixes having corresponding PMIs.

2. The method of claim 1, wherein a Singular Value Decomposition (SVD) of the $H_{BU}$ comprises a right singular matrix $U_{BU}$, and wherein the rotation is based at least in part on the $U_{BU}$.

3. The method of claim 1, wherein the secrecy information is extracted by finding the nearest precoding matrixes in the predefined codebook based on a vector-wise Chordal distance measure.

4. The method of claim 1, wherein the first reference signal is rotated with a random unitary matrix.

5. The method of claim 1, wherein the UE enables PSU for secure data transmission, and wherein the UE disables PSU for normal data transmission.

6. A user equipment (UE), comprising:
   a receiver that receives a first reference signal via a first downlink channel in a mobile communication network;
   a channel estimation module that performs channel estimation based on the first reference signal and thereby obtaining a first channel response matrix $H_{BU}$ of the first downlink channel;
   an encoder that encodes generated secrecy information onto a second reference signal via matching the secrecy information to a plurality of precoding matrix indexes (PMIs) of the first downlink channel; and
   a transmitter that transmits the second reference signal via a second uplink channel, wherein the secrecy information is hidden in the second uplink channel through a precoding operation such that the secrecy information can be extracted when the second uplink channel is reciprocal to the first downlink channel, wherein the precoding operation involves generating the second reference signal based on $H_{BU}$ and the plurality of PMIs, wherein the secrecy information comprises a plurality of bits grouped into a plurality of bit sequences with equal length, wherein each bit sequence is mapped to a Precoding Matrix Index (PMI) according to a predefined codebook, wherein the second reference signal is a rotated version of Demodulation Reference Signals (DMRSs), and wherein the rotation is based at least in part on precoding matrixes having corresponding PMIs.

7. The UE of claim 6, wherein a Singular Value Decomposition (SVD) of the $H_{BU}$ comprises a right singular matrix $U_{BU}$, and wherein the rotation is based at least in part on the $U_{BU}$.

8. The UE of claim 6, wherein the secrecy information is extracted by finding the nearest precoding matrixes in the predefined codebook based on a vector-wise Chordal distance measure.

9. The UE of claim 6, wherein the first reference signal is rotated with a random unitary matrix.

10. The UE of claim 6, wherein the UE enables PSU for secure data transmission, and wherein the UE disables PSU for normal data transmission.

11. A method of performing secret communication, the method comprising:
    (a) transmitting a first reference signal via a first downlink channel by a base station in a mobile communication network;
    (b) receiving a second reference signal via a second uplink channel, wherein the second reference signal contains encoded secrecy information hidden in the uplink channel through a precoding operation, wherein the secrecy information is encoded via matching the secrecy information to a plurality of precoding matrix indexes (PMIs) of the first downlink channel;
    (c) performing channel estimation based on the second reference signal, wherein the second uplink channel is reciprocal to the first downlink channel; and
    (d) extracting the secrecy information from the second reference signal, wherein the secrecy information is hidden in the second uplink channel through a precoding operation, and wherein the precoding operation involves generating the second reference signal based on the first downlink channel and the plurality of PMIs, wherein the secrecy information comprises a plurality of bits grouped into a plurality of bit sequences with equal length, wherein each bit sequence is mapped to a Precoding Matrix Index (PMI) according to a predefined codebook, wherein the second reference signal is a rotated version of Demodulation Reference Signals (DMRSs), and wherein the rotation is based at least in part on precoding matrixes having corresponding PMIs.

12. The method of claim 11, wherein the first reference signal is rotated with a random unitary matrix.

13. The method of claim 12, wherein the base station either generates the random unitary matrix among a frequency band for a fixed time, or generates the random unitary matrix periodically for a fixed frequency.

14. The method of claim 11, wherein the extracting in (d) involves finding the nearest precoding matrixes in the predefined codebook based on a vector-wise Chordal distance measure.

* * * * *